(12) United States Patent
Thanayankizil et al.

(10) Patent No.: US 9,439,232 B2
(45) Date of Patent: Sep. 6, 2016

(54) MANAGING TRADITIONAL WI-FI AND WI-FI DIRECT CONNECTIONS USING A WIRELESS DEVICE

(71) Applicants: General Motors LLC, Detroit, MI (US); GM Global Technology Operations LLC, Detroit, MI (US)

(72) Inventors: Lakshmi Thanayankizil, Rochester Hills, MI (US); Fan Bai, Ann Arbor, MI (US); David P. Pop, Garden City, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 100 days.

(21) Appl. No.: 14/157,897

(22) Filed: Jan. 17, 2014

(65) Prior Publication Data
US 2015/0208457 A1    Jul. 23, 2015

(51) Int. Cl.
*H04W 76/02*    (2009.01)
(52) U.S. Cl.
CPC ................................. *H04W 76/025* (2013.01)
(58) Field of Classification Search
None
See application file for complete search history.

(56) References Cited

U.S. PATENT DOCUMENTS

| 2012/0233266 A1* | 9/2012 | Hassan et al. ................. 709/206 |
| 2012/0296986 A1* | 11/2012 | Hassan et al. ................. 709/206 |
| 2014/0214241 A1* | 7/2014 | Ramamoorthy et al. ......... 701/2 |
| 2014/0214261 A1* | 7/2014 | Ramamoorthy et al. .... 701/31.5 |

\* cited by examiner

*Primary Examiner* — Ian N Moore
*Assistant Examiner* — Lakeram Jangbahadur
(74) *Attorney, Agent, or Firm* — Christopher DeVries; Reising Ethington P.C.

(57) ABSTRACT

A method of managing short-range wireless links between a primary wireless device and a plurality of secondary wireless devices includes initiating a short-range wireless link between the primary wireless device and a secondary wireless device configured to communicate using a traditional Wi-Fi protocol; providing the short-range wireless link between the primary wireless device and the secondary wireless device using a Wi-Fi direct protocol, wherein the primary wireless device acts as a group owner and the secondary wireless device acts as a group member; detecting the presence of an additional secondary wireless device, acting as a server, using the primary wireless device; ending use of the Wi-Fi direct protocol over the short-range wireless link between the primary wireless device and the secondary wireless device; and beginning use of the traditional Wi-Fi protocol over the short-range wireless link between the primary wireless device and the secondary wireless device.

4 Claims, 2 Drawing Sheets

MANAGING TRADITIONAL WI-FI AND WI-FI DIRECT CONNECTIONS USING A WIRELESS DEVICE

TECHNICAL FIELD

The present invention relates to wireless devices and more particularly to using a primary wireless device to manage Wi-Fi connections with a plurality of secondary wireless devices.

BACKGROUND

A vehicle infotainment system or vehicle telematics unit can simultaneously establish a plurality of short-range wireless communication links with other wireless devices, such as smart phones or tablets. Traditionally, the vehicle telematics unit can act as a server while the other wireless devices each act as a client to the server. But some wireless devices may attempt to establish a short-range wireless link with the vehicle telematics unit acting not as a client but rather as a server. This action can disrupt the short-range wireless links previously-established when the vehicle telematics unit operated as the server such that the connections can be lost. It is not reasonable to expect that all wireless devices will establish short-range wireless links using the same protocol. Thus, it can be helpful to manage new short-range communication links while maintaining existing short-range communication links in a way that the new link is established without disrupting the existing ones.

SUMMARY

According to an embodiment of the disclosure, there is provided a method of managing short-range wireless links between a primary wireless device and a plurality of secondary wireless devices. The method includes initiating a short-range wireless link between the primary wireless device and a secondary wireless device configured to communicate using a traditional Wi-Fi protocol; providing the short-range wireless link between the primary wireless device and the secondary wireless device using a Wi-Fi direct protocol, wherein the primary wireless device acts as a server and the secondary wireless device acts as a client; detecting the presence of an additional secondary wireless device acting as a server, using the primary wireless device; ending use of the Wi-Fi direct protocol over the short-range wireless link between the primary wireless device and the secondary wireless device; beginning use of the traditional Wi-Fi protocol over the short-range wireless link between the primary wireless device and the secondary wireless device; and providing another short-range wireless link between the primary wireless device and the additional secondary wireless device using the Wi-Fi direct protocol, wherein the primary wireless device acts as a client to the additional secondary wireless device.

According to another embodiment of the disclosure, there is provided a method of managing short-range wireless links between a primary wireless device and a plurality of secondary wireless devices. The method includes initiating a short-range wireless link between a vehicle telematics unit and a secondary wireless device configured to communicate using a traditional Wi-Fi protocol; providing the short-range wireless link between the vehicle telematics unit and the secondary wireless device using a Wi-Fi direct protocol, wherein the vehicle telematics unit acts as a server and the secondary wireless acts as a client; detecting the presence of an additional secondary wireless device acting as a server, using the vehicle telematics unit; ending use of the Wi-Fi direct protocol over the short-range wireless link between the vehicle telematics unit and the secondary wireless device; beginning use of the traditional Wi-Fi protocol over the short-range wireless link between the vehicle telematics unit and the secondary wireless device; and providing another short-range wireless link between the vehicle telematics unit and the additional secondary wireless device using the Wi-Fi direct protocol, wherein the vehicle telematics unit acts as a client to the additional secondary wireless device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
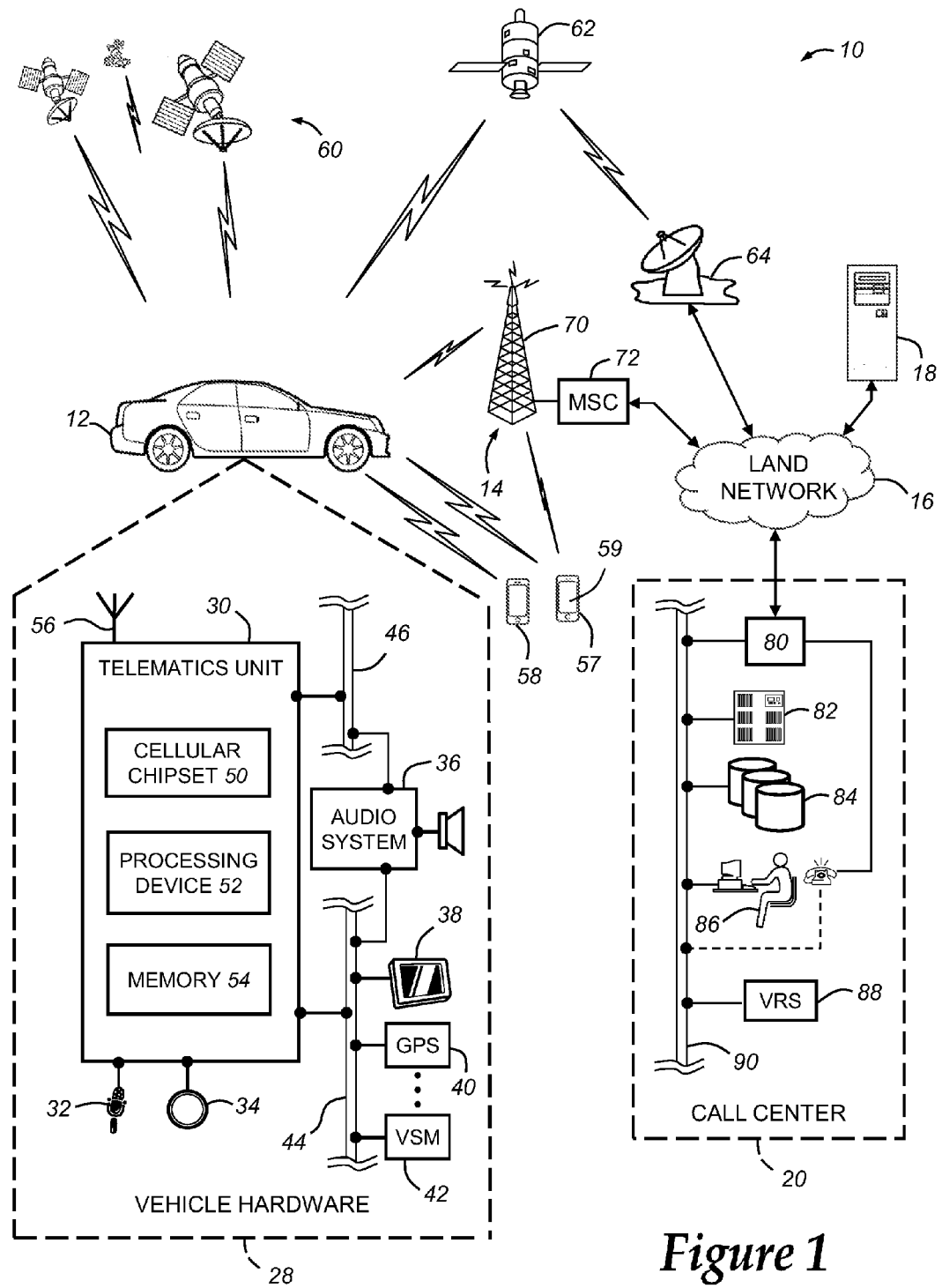
FIG. 1 is a block diagram depicting an embodiment of a communications system that is capable of utilizing the method disclosed herein.

The system and method described below can use a primary wireless device to manage a plurality of simultaneous short-range wireless links with secondary wireless devices. Specifically, the primary wireless device can be a vehicle telematics unit or a vehicle infotainment unit that acts as a server and establishes short-range wireless communication links with one or more secondary wireless devices, such as smart phones or tablets that operate as clients. As part of an attempt to establish a short-range wireless link with the primary wireless device, certain types of secondary wireless devices may inform the primary wireless device that they intend to act as the server. Some primary wireless devices may not be able to simultaneously act as the server to some secondary wireless devices and as the client to other secondary wireless devices. This condition can occur when one or more secondary wireless devices establish a short-range wireless communication link with the primary wireless device using a traditional Wi-Fi protocol while one or more other secondary wireless devices do so using a Wi-Fi direct protocol.

It is possible to use the primary wireless device to provide short-range wireless communication links using the Wi-Fi direct protocol to some secondary wireless devices that on their own may use the traditional Wi-Fi protocol. When an additional secondary wireless device attempts to establish a short-range communication link with the primary wireless device while it is also providing short-range wireless communication links to existing secondary wireless devices that use the traditional Wi-Fi protocol, the additional secondary wireless device may signal to the primary wireless device that the additional secondary wireless device will act as the client. In response, the primary wireless device can change from acting as a server to the existing secondary wireless devices using the Wi-Fi direct protocol to acting as a group owner using the traditional Wi-Fi protocol. In addition, the primary wireless device can establish a short-range communication link with the additional secondary wireless device using the Wi-Fi direct protocol such that the primary wireless device acts as a group member during this short-range communication link. The primary wireless device can then act as a server using the traditional Wi-Fi protocol while simultaneously acting as a group member using the Wi-Fi direct protocol. This is possible because the primary wireless device may be able to simultaneously act as a server using traditional Wi-Fi protocols and a client using Wi-Fi direct protocols, but not as both a group owner and a group member using Wi-Fi direct protocols. In the past, the short-range wireless communication links with the existing secondary wireless devices would be terminated by the creation of a new short-range wireless communication link with the additional secondary wireless device acting as a client. However, the method and system described herein can maintain the short-range wireless links between the primary wireless device acting as a server and the existing secondary wireless devices without interrupting data communications while creating a short-range wireless link between the additional secondary wireless device and the primary wireless device acting as a client with this additional device.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a wireless device, such as a smart phone 57. The smart phone 57 can include computer processing capability, a transceiver capable of communicating using a short-range wireless protocol, and a visual smart phone display 59. In some implementations, the smart phone display 59 includes a touch-screen graphical user interface. The smart phone 57 is configured to communicate using a traditional Wi-Fi protocol. Examples of the smart phone 57 include the iPhone™ manufactured by Apple, Inc. While the smart phone 57 may include the ability to communicate via cellular communications using the wireless carrier system 14, this is not always the case. For instance, Apple manufactures devices such as the various models of the iPad™ and iPod Touch™ that include the processing capability, the display 59, and the ability to communicate over a short-range wireless communication link. However, the iPod Touch™ and some iPads™ do not have cellular communication capabilities. Even so, these and other similar devices may be used or considered a type of wireless device, such as the smart phone 57, for the purposes of the method described herein.

A smart phone 58 is shown in FIG. 1. The smart phone 58 is functionally similar to the smart phone 57 with one distinction—the smart phone 58 can establish short-range wireless links using a Wi-Fi direct protocol. Examples of the smart phone 58 include the Droid™ manufactured by Motorola, Inc. as well as others that use the Android operating system. Like the smart phone 57, the smart phone 58 can include devices that do not have cellular communication capabilities. Both the smart phone 57 and the smart phone 58 are discussed below as examples of secondary wireless devices.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
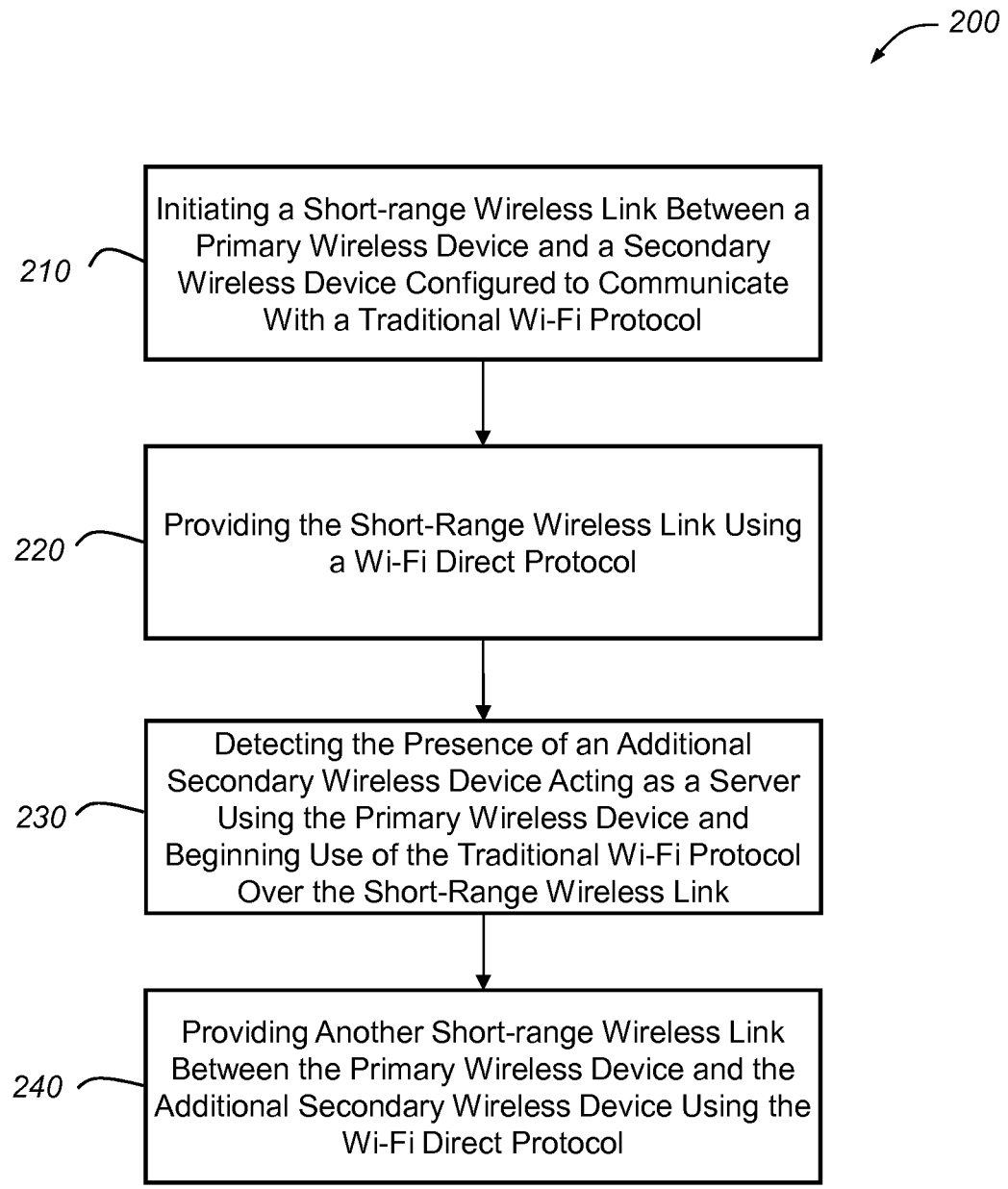
FIG. 2 is a flow chart of a method of managing short-range wireless links between a primary wireless device and a plurality of secondary wireless devices.

Turning now to FIG. 2, there is shown an implementation of a method 200 of managing short-range wireless links between a primary wireless device and a plurality of secondary wireless devices. The method 200 begins at step 210 by initiating a short-range wireless link between the primary wireless device and a secondary wireless device configured to communicate using a traditional Wi-Fi protocol. The primary wireless device can be implemented using a variety of wireless devices of differing designs. Not only can the primary wireless device include the ability to establish and maintain short-range wireless communication links with a plurality of secondary wireless devices, but the primary wireless device can do so using both the traditional Wi-Fi protocol as well as the Wi-Fi direct protocol. To communicate with secondary wireless devices over the short-range wireless links using traditional Wi-Fi protocol, the primary wireless device may act as a router or switch between a plurality of secondary wireless devices and be able to wirelessly communicate via the short-range wireless links. Traditional Wi-Fi can be viewed as including shot-range wireless communication protocols that use a primary wireless device acting as a server or switch to one or more secondary wireless devices. However, the primary wireless device can also communicate using the Wi-Fi direct protocol, the use of which does not include acting as the switch or router. The Wi-Fi direct protocol can be broadly viewed as including short-range wireless protocols that use a peer-to-peer wireless communication arrangement between wireless devices through a software solution.

In some implementations, the primary wireless device can be the vehicle telematics unit 30 described above with respect to FIG. 1 or a vehicle infotainment unit having short-range wireless communication abilities located within the vehicle 12. Vehicle infotainment units commonly provide a variety of information to vehicle occupants via the audio system 36 and/or the visual display 38, such as satellite radio programming, access to the Internet, and connections with secondary wireless devices, as well as terrestrial radio programming. The secondary wireless devices can be implemented as the smart phone 57 or the smart phone 58 having short-range wireless capabilities as described above. While the primary and secondary wireless devices have been described using the smart phone 57, the smart phone 58, the vehicle telematics unit 30, and the vehicle infotainment unit, it should be appreciated that other types of wireless devices using the short-range wireless communications techniques described herein can also implemented as well. In one example of how the method 200 can be carried out, the primary wireless device can be the vehicle telematics unit 30 and the secondary wireless device can be the smart phone 57 in the form of an iPhone produced by Apple. The iPhone in this example may not be able to communicate using the Wi-Fi direct protocols but instead be configured to use traditional Wi-Fi protocols. The method 200 proceeds to step 220.

At step 220, the short-range wireless link is provided between the primary wireless device and the secondary wireless device using a Wi-Fi direct protocol. The smart phone 57 (in this case, the iPhone) and the vehicle telematics unit 30 can together establish the short-range wireless link. As part of creating the short-range wireless link, the vehicle telematics unit 30 can determine that the smart phone 57 is configured to use only traditional Wi-Fi protocols. Despite the configuration of the smart phone 57, the vehicle telematics unit 30 can successfully provide the short-range wireless link using the Wi-Fi direct protocol. When the vehicle telematics unit 30 provides the short-range wireless link using the Wi-Fi direct protocol, the smart phone 57 can still communicate with the unit 30 even though the smart phone 57 is configured to use traditional Wi-Fi protocols. In this arrangement, the primary wireless device (vehicle telematics unit 30) can act as a server and the secondary wireless device (smart phone 57/iPhone) can act as a client. The method 200 proceeds to step 230.

At step 230, the presence of an additional secondary wireless device, acting as a server, is detected using the primary wireless device, such as vehicle telematics unit 30. After establishing the short-range wireless link with the smart phone 57, additional secondary wireless devices may be detected. And these additional secondary wireless devices may be configured to use the Wi-Fi direct protocol. As part of the Wi-Fi direct protocol, the additional secondary wireless devices may wirelessly send a request to act as the group owner to the primary wireless device. As noted above, the primary wireless device may not be able to act as a server to the smart phone 57 while acting as a group member to the additional secondary wireless device(s), such as smart phone 58. When the vehicle telematics unit 30 detects the additional secondary wireless device(s), such as the smart phone 58, the unit 30 can end use of the Wi-Fi direct protocol over the short-range wireless link between the unit 30 and the smart phone 57. This can also be followed by the primary wireless device (e.g., vehicle telematics unit 30) beginning use of the traditional Wi-Fi protocol over the short-range wireless link between the primary wireless device and the secondary wireless device (e.g., smart phone 57).

The change from the Wi-Fi direct protocol to the traditional Wi-Fi protocol between the vehicle telematics unit 30 and the smart phone 57 can be carried out in a number of ways. For instance, the secondary wireless device or smart phone 57 communicating via the short-range wireless link established during step 220 can be re-ported without interrupting data communications. That is, communications with the secondary wireless device(s) at the primary wireless device can use an address for one port to communicate when the primary wireless device is using the Wi-Fi direct protocol. However, when the primary wireless device begins using the traditional Wi-Fi protocol over the short-range wireless link with the smart phone 57, communications can then be routed to an address of a different port at the primary wireless device. This change in ports can be carried out on a data layer of an TCP/IP stack or on a media access control (MAC) sub-layer of the data layer. Such a change can be accomplished by instruction created by a microcontroller, such as the processor 52 discussed above. The port change can take place without interruption of data communications and without the knowledge of the user. The port change can result in the smart phone 57 continuing to act as a client but receiving the short-range wireless link via the traditional Wi-Fi protocol from the primary wireless device. The method 200 proceeds to step 240.

As step 240, another short-range wireless link is provided between the primary wireless device and the additional secondary wireless device using the Wi-Fi direct protocol. In addition to the existing short-range wireless link between, for example, the vehicle telematics unit 30 and the smart phone 57, the unit 30 can create another, separate short-range wireless link between the unit 30 and the smart phone 58. The vehicle telematics unit 30 can act as a client to the smart phone 58 via this separate short-range wireless link. And the creation of another short-range wireless link between the vehicle telematics unit 30 and the smart phone 58 will not interrupt the short-range wireless link between the unit 30 and the smart phone 57. In the example involving communications between the vehicle telematics unit 30, the smart phone 57, and the smart phone 58, the unit 30 can simultaneously act as a server to the smart phone 57 via the traditional Wi-Fi protocol and as a group member to the smart phone 58 via the Wi-Fi direct protocol.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of managing, using one or more processors located in a primary wireless device, short-range wireless links between the primary wireless device and a plurality of secondary wireless devices, comprising the steps of:
   (a) initiating a short-range wireless link between the primary wireless device and a secondary wireless device that communicates using a traditional Wi-Fi protocol, wherein the short-range wireless link is initiated either at the primary wireless device or the secondary wireless device and the primary device configured to communicate using a Wi-Fi direct protocol and the traditional Wi-Fi protocol;
(b) providing the short-range wireless link between the primary wireless device and the secondary wireless device using the Wi-Fi direct protocol, wherein the primary wireless device is a group owner and the secondary wireless device is a group member;
(c) detecting the presence of an additional secondary wireless device, that is a group owner, using the primary wireless device;
(d) ending use of the Wi-Fi direct protocol over the short-range wireless link between the primary wireless device and the secondary wireless device based on the detection in step (c);
(e) beginning use of the traditional Wi-Fi protocol over the short-range wireless link between the primary wireless device and the secondary wireless device after ending the use of the Wi-Fi direct protocol in step (d), wherein the primary wireless device becomes a server for the secondary wireless device; and
(f) providing another short-range wireless link between the primary wireless device and the additional secondary wireless device using the Wi-Fi direct protocol, wherein the primary wireless device becomes a group member to the additional secondary wireless device at the same time the primary wireless device is the server for the secondary device.

2. A method of managing, using one or more processors located in a primary device, short-range wireless links between the primary wireless device and a plurality of secondary wireless devices, comprising the steps of:
(a) initiating a short-range wireless link between a vehicle telematics unit and a secondary wireless device that communicates using a traditional Wi-Fi protocol, wherein the short-range wireless link is initiated either at the vehicle telematics unit or the secondary wireless device and the vehicle telematics unit configured to communicate using a Wi-Fi direct protocol and the traditional Wi-Fi protocol;
(b) providing the short-range wireless link between the vehicle telematics unit and the secondary wireless device using the Wi-Fi direct protocol, wherein the vehicle telematics unit is a group owner and the secondary wireless device is a group member;
(c) detecting the presence of an additional secondary wireless device that is a group owner using the vehicle telematics unit;
(d) ending use of the Wi-Fi direct protocol over the short-range wireless link between the vehicle telematics unit and the secondary wireless device based on the detection in step (c);
(e) beginning use of the traditional Wi-Fi protocol over the short-range wireless link between the vehicle telematics unit and the secondary wireless device, wherein the vehicle telematics unit becomes a server for the secondary wireless device; and
(f) providing another short-range wireless link between the vehicle telematics unit and the additional secondary wireless device using the Wi-Fi direct protocol, wherein the vehicle telematics unit becomes a group member to the additional secondary wireless device at the same time the vehicle telematics unit is the server for the secondary device.

3. The method of claim 2, further comprising executing steps (c)-(e) at the vehicle telematics unit.

4. A method of managing, using one or more processors located in a primary device, short-range wireless links between a vehicle infotainment unit and a plurality of secondary wireless devices, comprising the steps of:
(a) initiating a short-range wireless link between the vehicle infotainment unit and a secondary wireless device that communicates using a traditional Wi-Fi protocol, wherein the short-range wireless link is initiated either at the vehicle infotainment unit or the secondary wireless device and the vehicle infotainment unit configured to communicate using a Wi-Fi direct protocol and the traditional Wi-Fi protocol;
(b) providing the short-range wireless link between the vehicle infotainment unit and the secondary wireless device using the Wi-Fi direct protocol, wherein the vehicle infotainment unit is a group owner and the secondary wireless device is a group member;
(c) detecting the presence of an additional secondary wireless device that is a group owner using the vehicle infotainment unit;
(d) ending use of the Wi-Fi direct protocol over the short-range wireless link between the vehicle infotainment unit and the secondary wireless device based on the detection in step (c);
(e) beginning use of the traditional Wi-Fi protocol over the short-range wireless link between the vehicle infotainment unit and the secondary wireless device, wherein the vehicle infotainment unit becomes a server for the secondary wireless device; and
(f) providing another short-range wireless link between the vehicle infotainment unit and the additional secondary wireless device using the Wi-Fi direct protocol, wherein the vehicle infotainment unit becomes a group member to the additional secondary wireless device at the same time the vehicle infotainment unit is the server for the secondary device.

* * * * *